US011971982B2

(12) United States Patent
Nagara et al.

(10) Patent No.: US 11,971,982 B2
(45) Date of Patent: Apr. 30, 2024

(54) LOG ANALYSIS DEVICE

(71) Applicant: DENSO CORPORATION, Kariya (JP)

(72) Inventors: Keigo Nagara, Kariya (JP); Taiji Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 96 days.

(21) Appl. No.: 17/371,148

(22) Filed: Jul. 9, 2021

(65) Prior Publication Data

US 2022/0019661 A1 Jan. 20, 2022

(30) Foreign Application Priority Data

Jul. 14, 2020 (JP) ................................ 2020-120382

(51) Int. Cl.
*G06F 21/55* (2013.01)

(52) U.S. Cl.
CPC .................................. *G06F 21/552* (2013.01)

(58) Field of Classification Search
CPC .................................................. G06F 21/552
USPC ........................................................... 726/23
See application file for complete search history.

(56) References Cited

U.S. PATENT DOCUMENTS

| 10,516,683 | B2 * | 12/2019 | Conner | H04L 63/1425 |
| 11,539,720 | B2 * | 12/2022 | Reybok, Jr. | H04L 63/02 |
| 2016/0284212 | A1 * | 9/2016 | Tatourian | G08G 1/096775 |
| 2017/0286675 | A1 * | 10/2017 | Shin | H04L 63/1416 |
| 2018/0183773 | A1 * | 6/2018 | Nakagawa | H04L 63/0428 |
| 2018/0367553 | A1 * | 12/2018 | Hayden | H04L 63/1425 |
| 2019/0182275 | A1 * | 6/2019 | Ando | G06F 11/3476 |
| 2019/0349394 | A1 * | 11/2019 | Kishikawa | B60R 16/023 |
| 2020/0195613 | A1 * | 6/2020 | Loehr | H04L 63/0263 |
| 2020/0254946 | A1 * | 8/2020 | Ono | G06F 1/3206 |
| 2020/0336495 | A1 * | 10/2020 | Tada | H04L 43/16 |
| 2020/0336504 | A1 * | 10/2020 | Maeda | H04W 4/48 |
| 2021/0211442 | A1 | 7/2021 | Haga et al. | |
| 2021/0349977 | A1 * | 11/2021 | Kishikawa | H04W 12/122 |

(Continued)

FOREIGN PATENT DOCUMENTS

| JP | 2018-032254 A | 3/2018 |
| JP | 6433851 B2 | 12/2018 |
| WO | WO-2020/075826 A1 | 4/2020 |

(Continued)

OTHER PUBLICATIONS

WO 2017094262 A1 (Year: 2017).*

(Continued)

*Primary Examiner* — Bassam A Noaman
(74) *Attorney, Agent, or Firm* — Harness, Dickey & Pierce, P.L.C.

(57) ABSTRACT

A log analysis device is provided. The log analysis device receives a log indicating status of an electronic control system mounted in a movable object from the electronic control system, analyzes an abnormality in the electronic control system by using the log received. Depending on a result of the analyzing, the log analysis device determines, on a log-by-log basis, priority for the electronic control system to transmit the log to the log analysis device. Based on the priority determined, the log analysis device generates instruction information that gives an instruction for controlling transmission of the log, and transmits the instruction information to the electronic control system.

12 Claims, 8 Drawing Sheets

(56) References Cited

U.S. PATENT DOCUMENTS

2021/0368007 A1    11/2021   Hasegawa et al.

FOREIGN PATENT DOCUMENTS

WO    WO-2020080222 A1       4/2020
WO    WO-2020153122 A1 *     7/2020    ......... B60R 16/0232

OTHER PUBLICATIONS

U.S. Appl. No. 17/346,314, filed Jun. 14, 2021, Nagara et al.
U.S. Appl. No. 17/368,999, filed Jul. 7, 2021, Nagara et al.
U.S. Appl. No. 17/371,163, filed Jul. 9, 2021, Ishida et al.
U.S. Appl. No. 17/371,146, filed Jul. 9, 2021, Imoto et al.

* cited by examiner

FIG. 2

| Influence degree | Details |
|---|---|
| 6 | Concern about deadly accident or serious injury accident |
| 5 | Concern about minor injury accident |
| 4 | Causing user to feel dangerous due to irregular cases |
| 3 | Causing user to feel dissatisfied due to stop of traveling function |
| 2 | Causing user to feel dissatisfied due to traveling performance reduction or auxiliary function stop |
| 1 | Failing function for convenience or causing many users to feel uncomfortable |

FIG. 5

| Priority | Type of detection result | Security sensor |
|---|---|---|
| High | · Attack detected | · Sandbox abnormality detection sensor of C-ECU, EP ECU, etc.<br>· Anti-virus abnormality detection sensors of C-ECU, EP ECU, etc. |
| Inter-mediate | · Abnormality detected | · CAN ID/message abnormality detection sensor of C-ECU<br>· Process/permission monitoring sensor of respective ECU |
| Low | · Abnormality having small influence detected<br>· Defense already executed successfully | · CAN/Ether IDS of C-ECU<br>· Firewall of EP ECU and/or C-ECU<br>· Firewall of Ethernet |

FIG. 6

| Power status | IG | ACC | +B | ECU targeted at priority increase | Examples |
|---|---|---|---|---|---|
| OFF | - | - | ○ | ECU operable by +B power | ECUs for door lock, horn, etc. |
| ACC | - | ○ | ○ | ECU operable by ACC power | ECUs for car navigation, ETC, etc. |
| IG | ○ | ○ | ○ | ECU operable by IG power | All ECUs including those for air conditioning, power window, etc. |

FIG. 7

| ECU constituting attack path | Info that may leak out | Possible abuse of function |
|---|---|---|
| EP ECU | Communication history, e.g., service provider (center, etc.), access info as privacy access | Unauthorized communication to outside<br>Unauthorized access to C-ECU |
| C-ECU | Privacy info, e.g., travel history, position info, registered info (address, name, telephone number, etc.) | Unauthorized access to other ECUs |
| Common ECUs | - (Depends on respective ECU) | Hacking of vehicle control<br>Unauthorized access to other ECUs |

LOG ANALYSIS DEVICE

CROSS-REFERENCE TO RELATED APPLICATION

This application is based on Japanese Patent Application No. 2020-120382 filed on Jul. 14, 2020, the disclosure of which is incorporated herein by reference.

FIELD

The present disclosure relates to a log analysis device that analyzes a log of an electronic control system mounted in a movable object such as an automobile.

BACKGROUND

Cyber security is an issue in various fields including a field of vehicle for example.

SUMMARY

The present disclosure provides a log analysis device, a method and a program.

In a first example, there is provided a log analysis device that receives a log indicating status of an electronic control system mounted in a movable object from the electronic control system, and analyzes an abnormality in the electronic control system by using the log received. Depending on a result of the analyzing, the log analysis device determines, on a log-by-log basis, priority for the electronic control system to transmit the log to the log analysis device. Based on the priority determined, the log analysis device generates instruction information that gives an instruction for controlling transmission of the log, and transmits the instruction information to the electronic control system.

In a second example, there is provided a method comprising: receiving a log indicating status of an electronic control system from the electronic control system mounted in a movable object; analyzing an abnormality in the electronic control system by using the log received; depending on a result of the analyzing, determining, on a log-by-log basis, priority for the electronic control system to transmit the log; based on the priority determined, generating instruction information that gives an instruction for controlling transmission of the log; and transmitting the instruction information to the electronic control system.

In a third example, there is provided a program that causes a log analysis device to perform: receiving a log indicating status of an electronic control system from the electronic control system mounted in a movable object; analyzing an abnormality in the electronic control system by using the log received; depending on a result of the analyzing, determining, on a log-by-log basis, priority for the electronic control system to transmit the log; based on the priority determined, generating instruction information that gives an instruction for controlling transmission of the log; and transmitting the instruction information to the electronic control system.

BRIEF DESCRIPTION OF DRAWINGS

Objects, features and advantages of the present disclosure will become more apparent from the below detailed description made with reference to the accompanying drawings. In the drawings:

FIG. 2 is a diagram illustrating an example of the degree of influence specified by an influence specifying function of a log analyzer unit;

FIG. 5 is a diagram illustrating log analysis performed by the log analysis device;

FIG. 6 is a diagram illustrating log analysis performed by the log analysis device;

FIG. 7 is a diagram illustrating log analysis performed by the log analysis device;

DETAILED DESCRIPTION

Figure 1:
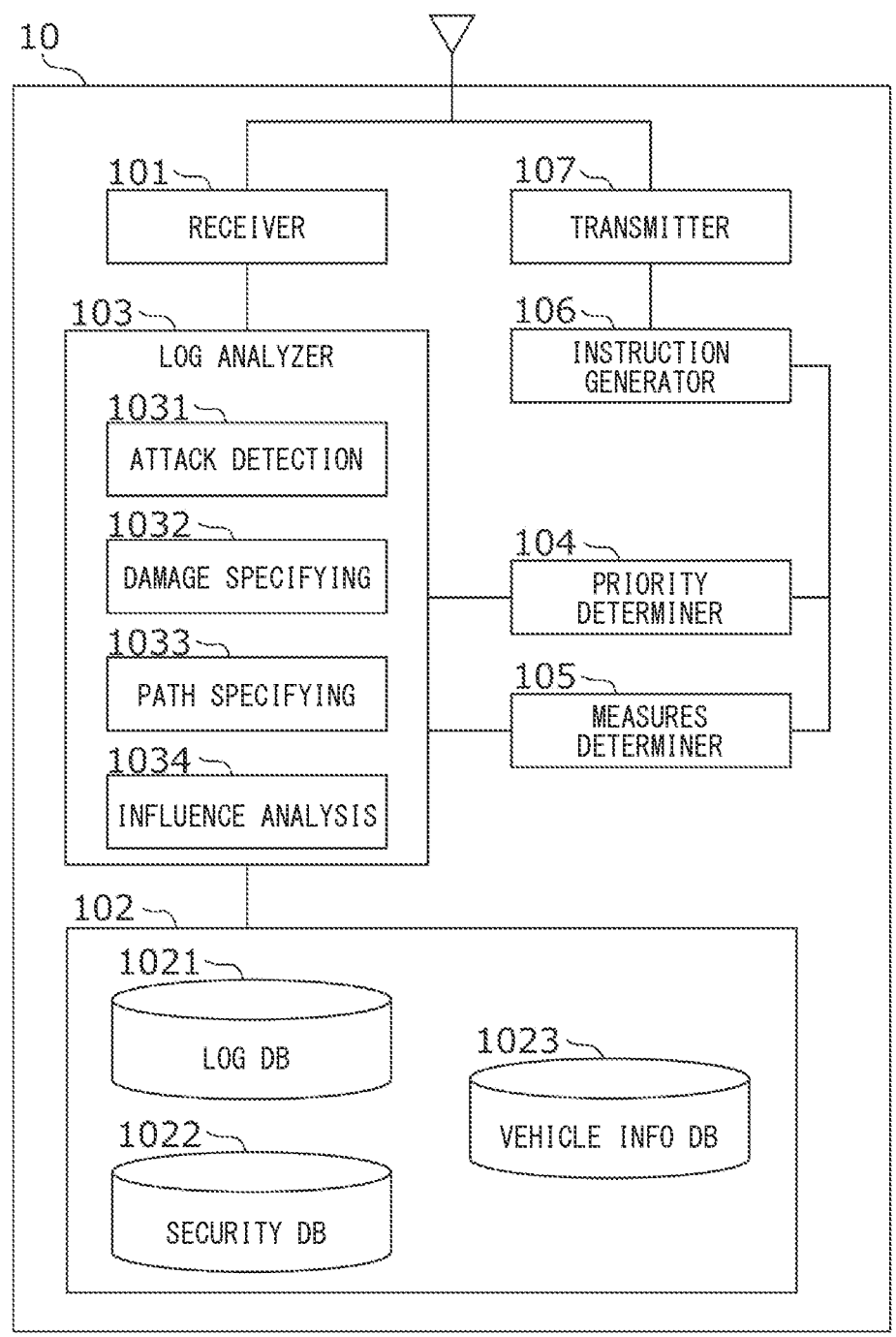
FIG. 1 is a block diagram illustrating an example of a configuration of a log analysis device.

In recent years, technologies for providing driver-assistance and autonomous driving control, including V2X communication such as vehicle-to-vehicle (V2V) communication and vehicle-to-infrastructure (V2I) communication, have attracted attention. Along with this, a vehicle has a communication function, and so-called connectivity of the vehicle has been promoted. As a result, a possibility of a cyber attack on a vehicle is increasing.

When a cyber attack on a vehicle occurs, the attack may hinder the control of the vehicle, and thus it is important to analyze cases in order that the attack be prevented in advance or that measures against the attack be taken and/or recover from the attack be made promptly. In view of this, a server device having a large amount of resource collects and makes analytics of logs of vehicle-mounted devices.

For example, a server device may make analytics of a log received from a vehicle-mounted device, and, upon detecting a possibility of cyber attack, may transmit an update command to the vehicle-mounted device to change the priority of a log to be accumulated in the vehicle-mounted device. When the vehicle-mounted device receives the update command for changing the priority so as to increase the priority of the log used for determining the cyber attack, the vehicle-mounted device may accumulate the log according to the priority and transmits the log to the server device. Consequently, the server device can collect the log while using limited resources.

The present inventors have found the following. The Log needed for further analytics of the details of the cyber attack and/or execution of measures against the attack vary depending on details of the cyber attack on the vehicle-mounted device. Thus, it is necessary that, based on a log analysis result, the server device determine and set the priority of the log necessary for further analysis.

An object of the present disclosure is to provide a technology that appropriately determines priority for log transmission from a vehicle-mounted system to a log analysis device depending on a result of analysis of the log in the log analysis device.

In an aspect of the present disclosure, there is provided a log analysis device comprising: a receiver unit that receives a log indicating status of an electronic control system mounted in a movable object from the electronic control system; a log analyzer unit that analyzes an abnormality in the electronic control system by using the log received by the receiver unit; a priority determiner unit that, depending on a result of the analyzing in the log analyzer unit, determines, on a log-by-log basis, priority for the electronic control system to transmit the log to the log analysis device; an instruction generator unit that, based on the priority determined by the priority determiner unit, generates instruction information that gives an instruction for controlling transmission of the log; and a transmitter unit that transmits the instruction information to the electronic control system.

With the above-described configuration, the log analysis device can appropriately determine, depending on a log analysis result, the priority for log transmission from to the log analysis device from a vehicle-mounted device.

Hereinafter, embodiments will be described with reference to the drawings.

In description of embodiments, effects of the embodiments may be described.

With regard to two or more embodiments, a configuration disclosed in a respective embodiment is not limited to the respective embodiment. Embodiments are combinable. For example, the configuration disclosed in one embodiment may be combined with another embodiment. The disclosed configurations in respective embodiments may be collected and combined.

1. Log Analysis Device (1) Configuration of Log Analysis Device

A configuration of a log analysis device 10 will be described with reference to FIG. 1. In the below, the log analysis device 10 may be described as a server device performing communication with a vehicle-mounted system (corresponding to an "electronic control system") mounted in a vehicle which is an example of "movable object". However, the log analysis device 10 is not limited to a server device performing communication with a vehicle-mounted system. For example, the log analysis device 10 may be a log analysis device performing communication with an electronic control system that is mounted in a movable object other than the vehicle. The log analysis device 10 may be mounted in a movable object to analyze a log. A vehicle-mounted system 20 performing communication with the log analysis device 10 will be described later.

The "movable object" refers to an object that is movable, and its travel speed is any speed, and therefore, the movable object in a stopped state is also the movable object. Examples of the movable object include, but not limited to, automobiles, motorcycles, bicycles, pedestrians, ships, aircrafts, and objects mounted therein.

The log analysis device 10 may be in a form of component, semifinished product, or finished product. In some embodiments, the log analysis device 10 is implemented by a semiconductor circuit in a server device, and is in the form of component.

Examples of the form of component include a semiconductor module. Examples of the form of semifinished product include an independent ECU. Examples of the form of finished product include a server, a workstation, a personal computer (PC), a smartphone, a cellular phone, and a navigation system.

The log analysis device 10, which is in the form of semiconductor circuit for example, may include a general-purpose central processing unit (CPU), a volatile memory such as a RAM, a non-volatile memory such as a ROM, a flash memory, or a hard disk, various interfaces, and an internal bus connecting these to each other. The hardware executes software, thereby implementing functions of respective functional blocks illustrated in FIG. 1.

The log analysis device 10 includes a receiver unit 101, a database 102, a log analyzer unit 103, a priority determiner unit 104, a measures determiner unit 105, an instruction generator unit 106, and a transmitter unit 107.

The receiver unit 101 performs communication with the vehicle-mounted system 20 by using a wireless communication network, and receives a log transmitted from the vehicle-mounted system 20. This log may be a log indicating a "status" of the vehicle-mounted system 20. The status of the vehicle-mounted system 20 includes not only status of the in-vehicle system 20 as a whole but also statuses of ECU(s) and/or an in-vehicle network included in the vehicle-mounted system.

Examples of the log indicating the "status" include: a log recording a dynamic status changing constantly, such as an operation of an ECU or a network included in the electronic control system, and a log recording a static status not changing basically, such as a version and/or a function of the ECU.

The database 102 incudes a log database (hereinafter, referred to as a log DB) 1021, a security database (hereinafter, referred to as a security DB) 1022, and a vehicle information database (hereinafter, referred to as a vehicle information DB) 1023. The log DB 1021 collects and accumulates the logs of the vehicle-mounted systems 20 received by the receiver unit 101. The security DB 1022 accumulates information on results of analysis in the below-described log analyzer unit 103, threats related to past cyber attacks, and vulnerabilities of the vehicle-mounted systems 20. The vehicle information DB 1023 accumulates information on constituent elements of the vehicle-mounted systems 20 of vehicles, which systems perform communications with the log analysis device 10. Examples of the information on the constituent elements include functions of the ECUs included in the vehicle-mounted system 20, an arrangement (e.g., locations) of the ECUs, version information of the ECUs, and the network that connects the ECUs to each other.

By using the information stored in the security DB 1022 and/or the vehicle information DB 1023, the log analyzer unit 103 analyzes the log received by the receiver unit 101. The log analyzer unit 103 includes various types of security sensors, and analyzes the log by using the security sensors. In an example described below, the log analyzer unit 103 performs three analyses by performing log analysis. The three analyses are an analysis (corresponding to a "first analysis") to detect an occurrence of an abnormality (for example, a cyber attack) in the vehicle-mounted system 20, an analysis (corresponding to a "second analysis") to make analytics of details of the detected abnormality for more information, and an analysis (corresponding to a "third analysis") to check for status of the vehicle-mounted system 20 after the measures against the abnormality.

The log analyzer unit 103 has a plurality of functions, and may execute the above-described three analyses by using the functions. In the example illustrated in FIG. 1, the log analyzer unit 103 has an attack detection function 1031, a damage specifying function 1032, a path specifying function 1033 and an influence analysis function 1034. The damage specifying function 1032 detects a cyber attack on the vehicle-mounted system 20. The damage specifying function 1032 specifies a damaged location or a damaged situation caused by the attack detected by the attack detection function. The path specifying function 1033 specifies an attack path or an attack source of the attack. The influence analysis function 1034 analyzes an influence caused by the cyber attack. Log analysis methods in the log analyzer unit 103 will be described later.

In the below, the log analyzer unit 103 will be described with reference to an example where an abnormality in the vehicle-mounted system 20 is caused by a cyber attack. However, this is not limiting, and the log analyzer unit 103 may perform log analysis to analyze an abnormality in the vehicle-mounted system 20 owing to other than a cyber attack.

The priority determiner unit 104 determines "priority" for the vehicle-mounted system 20 to transmit a log to the log analysis device 10, depending on a result of the log analysis in the log analyzer unit 103. The priority determiner unit 104 may determine, depending on the log analysis result, not only priority values but also the logs that are targeted for the priority determination. The "priority" for the vehicle-mounted system 20 to transmit the log includes not only priority of the log that the vehicle-mounted system 20 transmits, but also priority of the log that the vehicle-mounted system 20 collects from a respective electronic control device included in the vehicle-mounted system 20 in order for the vehicle-mounted system 20 to transmit the log to the log analysis device 10.

The "priority" may be expressed as indexes determined based on a predetermined evaluation criterion, and its expression way usable is various. For example, the priority may be expressed in symbol and/or number. The indexes may classify the priority into plural (e.g., high, low), finite or infinite.

It may be preferable that, at least twice, the priority determiner unit 104 determine the priority depending on the log analysis result in the log analyzer unit 103.

The log analyzer unit 103 analyzes the log. If an occurrence of an abnormality in the ECU of the vehicle-mounted system 20, for example, a cyber attack, is detected as a result of the log analysis, it is necessary that the log analyzer unit 103 collect a log needed for analytics of details of the attack for more information. In view of this, the priority determiner unit 104 determines the priority when a result of the analysis is that the attack on the vehicle-mounted system 20 is detected. In the following description, the priority determined upon making the analysis with the result that a cyber attack is detected will be referred to as first priority.

The log analyzer unit 103 makes analysis of the log (corresponding to a "first log") that is transmitted from the vehicle-mounted system 20 based on the first priority. Based on a result of the analysis of the first log, the measures against the cyber attack are determined. The priority determiner unit 104 determines the priority after the measures against the cyber attack After the measures against the cyber attack are executed, it may be preferable that the log analyzer unit 103 analyzes and checks for status of the vehicle-mounted system 20 after the measures against the attack, such as determining, by analyzing the log, whether or not the measures against the attack are appropriate and whether or not the damage caused by the attack is successfully resolved. In view of this, the priority determiner unit 104 determines the priority in order to collect the log for checking for status of the vehicle-mounted system 20 after the measures. In the following description, the priority determined for analyzing the log after the measures against the cyber attack will be referred to as second priority. In the above, a result of analytics, by the log analyzer unit 103, of details of the attack reveals the log needed to check for status of the vehicle-mounted system 20 after the measures. Therefore, the second priority is determined depending on a result of log analysis by the log analyzer unit 103 making analytics of the details of the attack. The log analyzer unit 103 can check for status of the vehicle-mounted system 20 by analyzing the log (corresponding to a "second log") that is transmitted from the vehicle-mounted system 20 based on the second priority.

In the below-described embodiment, a configuration for the priority determiner unit 104 to determine the first priority and the second priority will be described. In other embodiments, the priority determiner unit 104 may determine the priority three or more times depending on a log analysis situation.

The priority determined by the priority determiner unit 104 may be expressed as, for example, numerical values such as 1 to 10, or may be expressed as a plurality of levels such as high, intermediate, and low. Alternatively, the priority may be determined based on a relative evaluation with other log(s) or past log(s), such that the priority determined is expressed as being higher or lower than the past priority.

The measures determiner unit 105 determines measures against the cyber attack detected by the log analyzer unit 103. For example, the measures determiner unit 105 determines the measures against the attack based on the result of the analytics of the log that is transmitted from the vehicle-mounted system 20 based on the first priority. Examples of the measures against the cyber attack determined by the measures determiner unit 105 include restarting the ECU of the vehicle-mounted system 20, isolating the attacked ECU from other ECUs, and executing reprogramming by using a wireless communication network.

For example, for the ECU caused to stop an operation due to the attack or for the ECU unable to operate normally due to the attack, the measures determiner unit 105 determines that the measures against the attack are restart of the ECU.

If there is a possibility that the attacked ECU influences other ECUs, it may be preferable to shut off the attacked ECU or isolate the attacked ECU from other ECUs. When the log analyzer unit 103 detects a DoS attack, it may be preferable to shut off or isolate the ECU and to restrict communication between the ECUs or communication with the outside of the vehicle. Therefore, the measures determiner unit 105 may determine that a specific ECU be shut off, or isolated from other ECUs. Further, an ECU that manages highly important information (for example, an encryption key) may be shut off, and thus important information may be prevented from leaking out.

When restarting, shutting off, or isolating the ECU is insufficient as the measures against the attack, it may be determined that the reprograming or updating of the ECU, software, a file, or an encryption key be made.

There may be cases where the damage caused by the cyber attack is large, and the vehicle-mounted system 20 is unable to be recovered by the above-described restart, shutoff, isolation, and reprogramming, and it is necessary to take measures at a dealer of the vehicle or a repair shop of the vehicle. In such cases, the measures determiner unit 105 may determine to notify a user of the vehicle that the measures at the repair shop or the like are necessary.

There is a possibility that the same attack may be made to vehicles of the same vehicle model or type as those of the cyber-attacked vehicle, and to vehicles with the ECU of the same type and version as the cyber-attacked ECU. Therefore, the measures determiner unit 105 may further determine whether to check if there is a similar attack to a vehicle equivalent to the attacked vehicle and/or to a vehicle equipped with the same ECU as the attacked ECU. Vehicles equivalent to the attacked vehicle or vehicles equipped with the same ECU as the attacked vehicle are determinable using the information accumulated in the vehicle information DB 1023.

The instruction generator unit 106 generates instruction information (hereinafter, referred to as priority instruction information) for instructing the vehicle-mounted system 20 to transmit the log "based on" the priority determined by the priority determiner unit 104.

It may be sufficient that transmitting the log "based on" the priority achieves preferentially transmitting a higher priority log over transmitting a lower priority log by using the priority. Examples of transmitting the log "based on" the priority include: sequentially transmitting logs from a higher priority log; and making a transmission frequency of the higher priority log higher than a transmission frequency of a lower priority log.

When the measures determiner unit 105 determines the measures against the attack, the instruction generator unit 106 further generates instruction information (hereinafter, referred to as "measures instruction information") for instructing the vehicle-mounted system 20 to execute the measures. When the measures determiner unit 105 determines that reprograming be made, the instruction generator unit 106 may generate a program for reprogramming, or may acquire information for the reprogramming from a dedicated device provided outside the log analysis device 10.

The priority instruction information may further indicate a timing at which the vehicle-mounted system 20 makes priority assignment to the logs. For example, the priority instruction information may include an instruction for starting the priority assignment to the logs at a time of turning the ignition of the vehicle from OFF to ON. In this regard, some devices (for example, car navigation systems) operate during ON status of ACC power even when the ignition of the vehicle is in OFF. Thus, regarding the log indicating the status of a device that operates when the ignition is in off, the instruction may be such that the priority be retroactively assigned to the logs acquired during OFF of the ignition. Alternatively, the instruction may be such that the priority be assigned to past logs accumulated in the vehicle-mounted system 20.

The transmitter unit 107 transmits the instruction information generated by the instruction generator unit 106 to the vehicle-mounted system 20, specifically, the priority instruction information and the measures instruction information.

(2) Log Analysis by Log Analyzer Unit

Next, a log analysis method performed by the log analyzer unit 103 will be described.

(2-1) Log Analysis in Attack Detection Function

The attack detection function 1031 of the log analyzer unit 103 make analysis to determine whether or not the log received by the receiver unit 101 is normal, and to detect an occurrence of the attack when the log is not normal. In cases of the vehicle-mounted system 20 including an abnormality detection device, a flag or additional information indicating an abnormality or a normality may be added to the log. Therefore, when there is a flag or additional information indicating an abnormality added to the log, the attack detection function 1031 may determine whether the log is really an abnormal log. The attack detection function 1031 detects an attack on the vehicle-mounted system 20 by using the following method.

The attack detection function 1031 analyzes the log periodically received by the receiver unit 101, and when an abnormality in the log is found, detects an occurrence of a cyber attack on the vehicle-mounted system 20.

The attack detection function 1031 detects the occurrence of an attack on the vehicle-mounted system 20 based on the log of the security sensor. The log of the security sensor is the log to which the flag or the additional information indicating an occurrence of an abnormality is added.

Alternatively, the occurrence of an attack is detected based on a correlation between logs indicating statuses of two or more ECUs included in the vehicle-mounted system 20. For example, there is a correlation between a log (hereinafter, referred to as a log "a") indicating a gear position and a log (hereinafter, referred to as log "b") indicating a speed of the vehicle. When the gear is in a parking (P) position, the speed of the vehicle is supposed to be zero. In this regard, when the log "b" indicates the speed higher than 0 while the log "a" indicates the parking position, there is a possibility of an occurrence of a certain abnormality in the vehicle or that the log may be incorrect and rewritten due to an attack. Based on this kind of correlation between the logs, the attack detection function 1031 may detect the occurrence of an attack.

The attack detection function 1031 may perform attack detection by using various methods. One example of the detection method includes comparing a blacklist and a whitelist with a list of logs received from the vehicle-mounted system 20 to detect the presence or absence of an abnormality. Another example of the method includes checking for consistency of the versions of the ECUs indicated by the logs. Yet another example of the method includes anomaly detection of an abnormal value out of values indicated by respective logs using a machine learning algorithm. Alternatively or additionally, a user such as a security analyst who uses the log analysis device 10 may perform abnormality detection by checking details of a log to detect the occurrence of a cyber attack.

When the attack detection function 1031 detects the occurrence of an attack, it is preferable to store the time of occurrence of the attack, the time of specifying the attack by the attack detection function 1031, the log used in detecting the attack, and the like in the security DB 1022.

(2-2) Log Analysis in Damage Specifying Function

When the attack detection function 1031 detects an attack, the damage specifying function 1032 of the log analyzer unit 103 specifies a damage in the vehicle-mounted system 20 due to the cyber attack, by using, for example, the below-described method. The damage in the vehicle-mounted system 20 may include a location of the damage and the degree of the damage.

When an abnormality detected is an abnormity in a log indicating status of an ECU at an entry point among ECUs included in the vehicle-mounted system 20, the damage specifying function 1032 checks whether or not there is an abnormality in a log of an other ECU(s) connected to the entry point ECU, and specifies whether or not any damage due the attack in the ECU connected to the entry point ECU(s) is present. When a log related to an application is detected as abnormal, the damage specifying function 1032 specifies that there is a damage of an application layer. The entry point ECU(s) may be, but not limited to, an external communication ECU for performing communication with the outside of the vehicle and/or a gateway ECU.

The damage specifying function 1032 further specifies a process unauthorized accessed, a process spoofed, or a process abnormally using a resource, from a target item of the log.

The damage specifying function 1032 may further specify a location damaged by the attack by specifying, of the functions of the vehicle-mounted system 20, the function stopped by the attack, by using the target item of the log. The function stopped by the attack may be the protection function or the abnormality detecting function.

In another method, the damage specifying function 1032 specifies that there is a damage of an OS layer, upon detecting an abnormality in an OS log.

For specifying that there is the damage of the OS layer, the damage specifying function 1032 specifies a process associated with the unauthorized spoofed log and/or a process abnormally using the resource, by using the target item of the log.

In still another method, the damage specifying function 1032 specifies that there is the damage of the OS layer, upon detecting an abnormality in a log of secure boot.

Further, the damage specifying function 1032 may specify an unauthorized program file by checking the names of the program files, by using the target item of the log.

When an abnormality in a communication log of a network connecting the ECUs included in the vehicle-mounted system 20 is detected, the damage specifying function 1032 specifies that a network layer is damaged.

The damage specifying function 1032 may, using the target item of the log, specify a damaged location by performing one or more of the followings: checking for a spoofed message to specify an unauthorized message; checking for a message violating preset specifications to specify an unauthorized message; specifying a Dos attack message to specify an unauthorized message; checking for a message transmitted from an unauthorized domain, port number, IP address to specify an unauthorized message.

When an abnormality in a log of a certificate is detected, the damage specifying function 1032 specifies that a management layer of the certificate is damaged.

Upon the damage specifying function 1032 specifying the location damaged by the cyber attack, it may be preferable to record the specified damaged-location and the degree of damage. For example, the log used in specifying the damaged location and/or the ECU whose status is indicated by this log may be recorded in the security DB 1022 in association with the damaged ECU and the damaged layer (for example, application, OS, base software, network, semiconductor, management, etc.) of the ECU.

(2-3) Log Analysis in Path Specifying Function

After the damage specifying function 1032 specifies the damage, the path specifying function 1033 of the log analyzer unit 103 specifies an attack path and/or an intrusion path of the cyber attack on the vehicle-mounted system 20, by using the later-described method for example. The path specifying function 1033 may further specify an attacker (for example, a communication source such as an IP address) in addition to the attack path.

The path specifying function 1033 specifies an intrusion path from the outside of the vehicle to the entry point based on, for example, a communication log.

Specifically, the path specifying function 1033 specifies the entry point ECU used in the attack, specifically, the entry point ECU hacked by the attack, based on a log of communication with the outside of the vehicle (also referred to as a vehicle outside communication log). The path specifying function 1033 may specify the path used in the attack, based on the transmission source and the transmission destination in the abnormal log. Additionally or alternatively, the intrusion path may be specified based on the transmission destination and the transmission source in the vehicle outside communication log of the entry point. The intrusion path may be specified based on a log indicating information regarding an ECU via which the connection destination ECU is reached from the entry point.

By using a log, the path specifying function 1033 may further specify, of a route(s) from the entry point to end point(s) (e.g., terminal ECU(s)), a path possibly used in the cyber attack. Specifically, the path specifying function 1033 may specify the path possibly used in the attack, by linking logs of communications inside the vehicle-mounted system 20. For example, the attack path is specified based on information regarding a transmission source ECU and a transmission destination ECU in the abnormality detected log, information regarding the ECU connected to the end point, and information regarding an ECU via which the external communication ECU is reached from the ECU connected to the end point.

Upon the path specifying function 1033 specifying the attack path and/or the intrusion path of the cyber attack, it may be preferable to record the specified path and/or the specified result. For example, the log of the external communication ECU, the log of the gateway ECU, the log indicating communications performed by the ECU(s), and/or the possible attack-advancing path are specified and recorded. The possible attack-advancing path may be part of a path(s) from the external communication ECU or the gateway ECU to the terminal ECUs.

(2-4) Log Analysis in Influence Analysis Function

For the degree of influence of the cyber attack on the vehicle-mounted system 20, the influence analysis function 1034 of the log analyzer unit makes quantitative analysis by, for example, the later-described method. The degree of influence includes not only an influence on the damaged ECU but also an influence on the vehicle as a whole and an influence on a user (for example, an occupant or a passenger) of the vehicle.

The degree of influence of the cyber attack may be obtained by performing the analysis according to, for example, the abnormality occurrence location, details of the abnormality, the degree of difficulty in taking the measures against the abnormality, and the ease of attack. When the abnormality occurrence location is an ECU and/or software that directly influence traveling of the vehicle, the analysis result may be that the degree of influence due to the occurrence of the abnormality is high. On the other hand, for example, in a case where the abnormality occurrence location is not a location that directly influences the traveling of the vehicle but, for example, an ECU or software for entertaining the user of the vehicle, the analysis result may be that the degree of influence due to the occurrence of the abnormality is low.

The degree of influence of an occurrence of an abnormality in an ECU differs depending on details of the abnormality even when the abnormality occurs in the same ECU. Thus, for the degree of influence, the analysis may be made according to the type of the abnormality in the ECU and/or a difference between an abnormal value indicated by the log and a normal value.

For taking measures against the attack, the analysis for the degree of influence may be made taking into account, for example, whether it is necessary to shut off the ECU or isolate the ECU from the in-vehicle network, whether or not reprogramming using wireless communication is possible, or whether recall is necessary. For example, when the reprogramming using the wireless communication is possible, the degree of influence of a cyber attack found as a result of the analysis may be lower than that when recall is necessary.

The influence analysis function 1034 may make the analysis to determine how the degree of influence is, according to the degree of difficulty of the cyber attack. For example, when the degree of difficulty of the attack is low, there is a high possibility that a similar attack may be repeatedly made, or a similar attack may also be made on the vehicle-mounted equipment of another vehicle. Therefore, when the degree of difficulty of the attack is low, a result of the analysis is that the degree of influence is high.

Via making a comprehensive determination using the above-mentioned parameters, the influence analysis function 1034 may make the analysis to determine the degree of influence in respect of a risk to the vehicle and the user of the vehicle. FIG. 2 illustrates an example of the degree of influence determined by the influence analysis function 1034 analyzing the log. FIG. 2 describes an example in which the influence analysis function 1034 determines the degree of influence in six levels.

For example, the influence degree 6 indicates that there is a concern about a deadly accident or a serious injury accident. As described above, when a location of the occurrence of the attack or the location damaged by the attack directly influences the traveling of the vehicle, there is a concern that the deadly accident or the serious injury accident of the vehicle may occur. Therefore, in such a case, the influence analysis function 1034 determines that the degree of influence is the highest, in one embodiment, the influence degree is 6. On the other hand, when the attack occurrence location or the damaged location relates to a function for the user entertainment, there is a concern that the user may feel discomfort although the influence on the traveling of the vehicle may be low. Therefore, the influence analysis function 1034 determines that the degree of influence is the lowest, in one embodiment, 1.

In another example, the influence analysis function 1034 may make the analysis to determine the degree of influence, based on the detected attack scenario of the cyber attack. In case of having a multilayer defense system, the influence analysis function 1034 may make the analysis to determine the degree of influence, based on an invasion degree of the attack The multilayer defense system is for vehicle security protection. For example, the multilayer defense system protects the vehicle by using an external connection authentication function for authenticating connection to the outside of the vehicle, a gateway function for separating an attack from the outside from the inside of the vehicle, an authentication function for securing a communication system inside the vehicle, and an ECU protection function for protecting an electronic control device (e.g., ECU). When an attack reaches the second layer (for example, the gateway function) without detecting an abnormality in the first layer (for example, the external connection authentication function), it may be determined that the degree of influence is high.

The influence analysis function 1034 may make the analysis to determine the degree of influence by weighting the degrees of influences depending on the arrangement of attacked ECUs.

In the case of a plurality of abnormalities occurring, the degree of influence of the attack may become serious, and thus the degree of influence may be corrected depending on whether or not other sensors are operating normally.

The analysis to determine the degree of influence may be made according to status of abnormality detection of the vehicle-mounted system 20. In some cases, although the vehicle-mounted system 20 may have an abnormality detection function, the detection function of the vehicle-mounted system may not operate and may not detect the abnormality nor the attack. In this case, the degree of influence on the vehicle is regarded high. In view of this, the analysis for determining the degree of influence may be made based on whether the detection function of the vehicle-mounted system has been operated. Further, when the abnormality has been successfully detected by the vehicle-mounted system 20, the analysis may be made based on whether the abnormality has been successfully detected at the intrusion stage of the attack.

In cases where a degree of progression of the attack is specifiable based on a cyber kill chain structuring cyber attacks, the analysis may be made for the degree of influence based on the degree of progression.

In analyzing the log using the attack detection function 1031, the damage specifying function 1032, the path specifying function 1033, and the influence analysis function 1034, the log analyzer unit 103 may perform log analysis using the vehicle information stored in the vehicle information DB 1023 in addition to the log received from the vehicle-mounted system 20. For example, the damage specifying function 1032, the path specifying function 1033, and the influence analysis function 1034 of the log analyzer unit 103 may analyze the damaged location, the attack path, and the degree of influence based on items obtained from the vehicle information, examples of which items include functions and/or communications of the vehicle, and connections and/or associations between the ECUs.

More specifically, the log analysis may be made such that as the analysis advances, analysis targets increases, where a range of the analysis is narrowed down in order of the ECU version information, the ECU type, the vehicle type, and the vehicle model by using the vehicle information stored in the vehicle information DB 1023.

(3) Operation of Log Analysis Device

Next, an operation of the log analysis device 10 will be described with reference to FIGS. 3 and 4. The following operation is regarded as not only disclosure of a log analysis method using the log analysis device 10, but also disclosure of a program for processing procedures executed by the log analysis device 10. These processes are not limited to being executed in the order illustrated in FIGS. 3 and 4. Specifically, the order may be changed as long as such changes are free from restrictions such as a relationship in which a certain step uses a result of the preceding step. The same applies not only to the present embodiment but also other embodiments.

Figure 3:
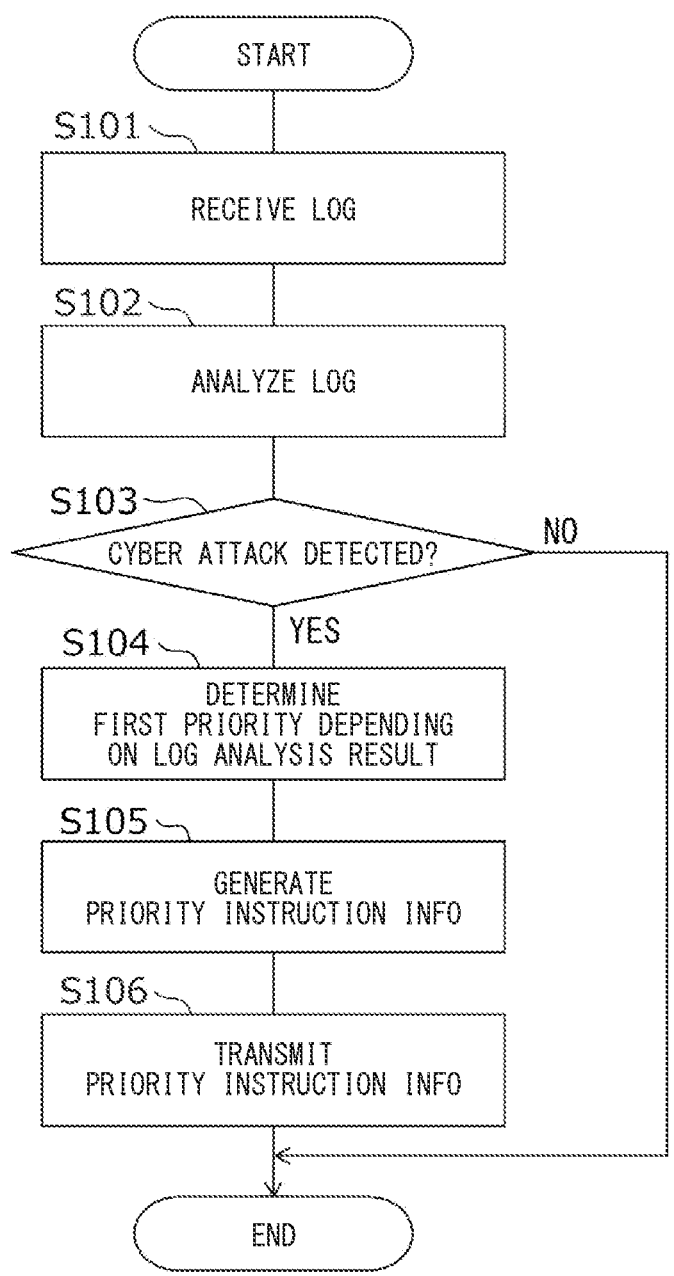
FIG. 3 is a flowchart illustrating an operation of the log analysis device.

FIG. 3 is a flowchart illustrating a process of determining first priority in response to analyzing the log received from the vehicle-mounted system 200 and as a result detecting the cyber attack. The process of determining the first priory is performed in order for the log analyzer unit 103 to make analytics of the attack in details for more information.

In S101, the receiver unit 101 receives a log transmitted from the vehicle-mounted system 20.

In step S102, the log analyzer unit 103 analyzes the log received in step S101.

In S103, the log analyzer unit 103 determines whether the cyber attack detected is present. Upon the log analyzer unit 103 detecting the cyber attack (S103: Yes), the priority determiner unit 104 determines the first priority depending on a result of the log analysis (S104). Specifically, inn step S104, the log analyzer unit 103 determines the first priority such that the priority of the log needed to make analytics of the attack in details for more information becomes high.

In step S105, the instruction generator unit 106 generates priority instruction information that gives an instruction for controlling transmission of the log based on the first priority determined in step S104.

In S106, the log analysis device 10 transmits the priority instruction information generated in S105 to the vehicle-mounted system 20.

Figure 4:
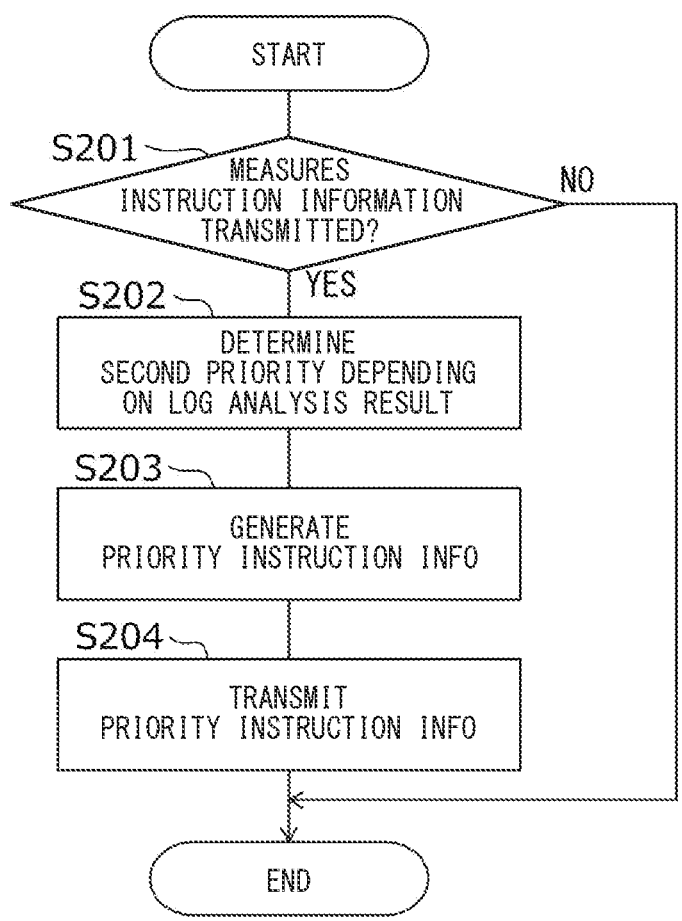
FIG. 4 is a flowchart illustrating an operation of the log analysis device.

FIG. 4 is a flowchart illustrating a process of determining the second priority. The second priory is determined after the log is transmitted from the vehicle-mounted system 20 based on the first priority determined in the process in FIG. 3 and the analytics of the log is made and then the measures against the cyber attack are executed in the vehicle-mounted system 20.

In S201, the log analysis device 10 determines whether or not the measures instruction information, which is the instruction information that gives an instruction for executing the measures against the cyber attack, has been transmitted to the vehicle-mounted system 20.

When it is determined that the measures instruction information has been transmitted (S201: Yes), the process proceeds to S202. In S202, the priority determiner unit 104 determines the second priority depending on the log analysis result. In S202, the log analysis device 10 determines the second priority such that the priority of the log needed to check for status of the vehicle-mounted system 20 after the measures becomes higher. Examples of checking for status of the vehicle-mounted system 20 after the measures may include checking whether or not the measures against the cyber attack included in the measures instruction information is appropriate.

In step S203, the instruction generator unit 106 generates the priority instruction information which is the instruction information that gives an instruction for controlling transmission of the log based on the second priority determined in step S202.

In S204, the log analysis device 10 transmits the priority instruction information generated in S203 to the vehicle-mounted system 20.

(4) Determination of Priority

In this section, specific examples of the priority determined by the priority determiner unit 104 will be described.

(a) Determination of the First Priority (i) Determination of the Priority Depending on Type of Abnormality and Type of Security Sensor that has Detected Abnormality The log analyzer unit 103 determines a priority value of the log in which the abnormality is detected and a priority value of the log related thereto, depending on the type of the detected abnormality and the type of the security sensor having detected the abnormality. FIG. 5 illustrates an example of setting the priority depending on the detected abnormality and the security sensor that has detected the abnormality.

It is conceivable that the abnormalities detected by the log analyzer unit 103 may include an abnormality that has occurred due to a cyber attack and an abnormality that has occurred not due to an attack. Therefore, upon the log analyzer unit 103 detecting the occurrence of the abnormality owing to the cyber attack, the priority determiner unit 104 determines that high priority be set to the first priority. The occurrence of the abnormality owing to the cyber attack may be detected by a security sensor of the entry point ECU (also referred to herein as EP ECU) and a security sensor of a central ECU (also referred to herein as C-ECU). Examples of the security sensor include a sandbox abnormality detection sensor and an anti-virus abnormality detection sensor.

On the other hand, upon he log analyzer unit 103 detecting the occurrence of the abnormality not owing to the attack, the priority determiner unit 104 determines that lower priority be set to the first priority than upon detecting the occurrence of the abnormality owing to the attack. For example, upon detecting the occurrence of the abnormality not owing to the attack, the first priory is set to intermediate priority. The occurrence of the abnormality not owing to the attack may be detected by such a security sensor of the C-ECU as an abnormality detection sensor for CAN ID and/or message abnormality detection, and a process/permission monitoring sensor of a respective ECU.

When the abnormality detected by the log analyzer unit 103 has a small influence on the vehicle-mounted system 20, e.g., when the detected abnormality is communication timing displacement, the necessity to increase the priority is small. In another cases where the vehicle-mounted system 20 detected an abnormality or an attack and already took such measures successfully as communication deny and log discard, the necessity to increase the priority is small. In view of this, in the above-kind case, the priority determiner unit 104 may determines the first priory be set lower priority than in the case where the attack or abnormality is detected by the log analysis device 10. Whether the above kind of abnormality is present and whether the measures against the abnormality are already executed may be detected by such a sensor senor as CAN/Ether IDS of the C-ECU, a firewall of the EP-ECU, a firewall of the C-ECU, a firewall of Ethernet, etc. In cases where the measures against the abnormality are executed but unsuccessful, it may be preferable to set the high priority.

(ii) Determination of Priority According to Vehicle Status

The priority determiner unit 104 may determine the priority depending on status of the vehicle. For example, the priority determiner unit 104 determines the priority such that the priority of the ECU operating depending on status of the vehicle becomes higher. Specifically, when the vehicle is traveling, the priority is determined such that the priority of the log of the ECU related to the traveling is high, and the priority of the log of the ECU other than the ECU related to the traveling is high while the vehicle is in the stopped state.

Alternatively, the priority determiner unit 104 may determine the priority according to change in power supply status of the vehicle, the vehicle-mounted system, and the ECU. For example, at a time of startup of an ECU, the ECU is vulnerable to an attack or exhibit an abnormal behavior. Also, immediately after the ECU startup, it may be necessary to ascertain whether or not the ECU is normal. Therefore, when there is a change in the power supply status of the IG (ignition) or the ACC (accessory power supply), the priority of the log of the ECU configured to start up in response to the change is determined high.

FIG. 6 illustrates examples of target ECUs for which the high priority is determined depending on the power supply status. In FIG. 6, three examples of ECUs are illustrated. The target ECU of the first example is the ECU that is in operation when +B power, which is the power always supplied, is in ON even in cases where the IG power and the ACC power are in OFF. Specifically, the target ECU of the first example starts up in response to the turn ON of the +B power. The target ECU of the second example is the ECU that is in operation on condition that the ACC power is in ON. Specifically, the target ECU of the second example starts up in response to the turn ON of the ACC power. The target ECU of the third example is the ECU that is in operation when the IG power and the ACC power both are in ON. Specifically, the target ECU of the third example starts up in response to the turn ON of the IG power.

For example, when the IG and the ACC are in OFF and only the constant power supply, i.e., the +B power, is in ON, there is a high possibility that a log may not be collected in the vehicle-mounted system 20 from the viewpoint of the power supply cost. However, with regard to the log of the ECU that starts up and operates by the +B power, the priority may be determined so as to be high even during only the constant power supply, i.e., the +B power, is in ON. Examples of such logs include a log related to a door lock and a log related to a horn.

Also, the priority may be determined so that in the status where the IG power is in OFF and the ACC power is ON, the log related to an ECU that operates and starts by the ACC is high priority. Examples of such logs include a log related to a car navigation and a log related to an ECU.

Also, the priority may be determined sop that in status where both of the IG power and the ACC power are in ON, a log related to an ECU that starts up and operates by the IG power is high priority. Examples of such logs include a log of an ECU for air conditioning ECU, and a log of an ECU for a power window. In a case where the ACC power supply is reset in response to turning on/off of the IG power the priority may be determined so that the priority of a log related to the ACC power supply becomes (i.e., is changed to) high in response to turning ON of the IG power. Since basically all of the ECUs are in operation when the IG power is in ON, the priority may be determined such that the log of a particular ECU is high priority during the ON status of the IG power.

In some cases, depending on the attack path specified by the path specifying function 1033 of the log analyzer unit 103, logs output from two or more ECUs are to be collected. In such cases, the priority may be determined for the logs depending on the status of the vehicle in the way described above.

As described above, the priority determiner unit 104 may determine the priority of the log depending on the status of the vehicle, specifically, a power supply status of the vehicle-mounted system and a power supply status of a respective ECU. In this case, the log for which the priority is determined may be that output from the ECU of which the power supply status is determined.

(iii) Determination of Priority Depending on Specified Attack Path

Upon the path specifying function 1033 of the log analyzer unit 103 specifying an attack path, the priority determiner unit 104 may determine the priority of the log depending on information protected by an ECU present on the attack path or a function of the ECU present on the attack path.

FIG. 7 illustrates examples of information that may leak out due to an attack and example of a function that may be exploited by the attack, for each ECU on the attack path.

For example, in case of the attack path using (abusing) the EP ECU, there is a concern of leaking out information on a communication history, in particular, information on a service provider (center) and access information serving as privacy information. In case of the attack path using the EP ECU, a function of communication with the outside or a function of access to the C-ECU may be exploited, and unauthorized communication with the outside or unauthorized access to the C-ECU may be performed. Therefore, upon specifying the attack path using the EP ECU, the priory may be determined so that the log related to the EP-ECU is high priority.

In case of the attack path using the use of the C-ECU, there is a concern about leak out of the privacy information, for example, registered information such as a travel history, position information, an address, a name, and a telephone number. The C-ECU in particular has a lot of privacy information, and accordingly, the attack path involving the use of the C-ECU may create a concern about exploit of the vulnerability of ECUs on the attack path information leak out. Also, there is a concern about exploit of an access function to an ECU that is in a lower layer than the C-ECU and about the unauthorized access to ECUs. Therefore, upon specifying the attack path using the C-ECU, the priority may be determined so that the log related to the C-ECU is high priority.

As described above, in case of the attack path using the EP ECU or the C-ECU, there is a concern of leak out of highly confidential information and/or highly important information. Therefore, the priority determiner unit 104 may determine the priority depending on the type of information protected by a respective ECU, specifically, depending on the type of information likely subject to the leak out due to the attack. The "type" of information includes not only details of information such as whether or not the information is privacy information, but also the confidentiality or the importance of the information. When the type of the information protected is the privacy information or the information highly confidential or important, the priority may be determined so that relevant log is high priority. For example, in the case of the attack path using the C-ECU or the EP ECU, the priority may be determined so that the C-ECU is highest priority in order to protect personal information of a user and the EP ECU is intermediate priority.

In the case of the attack path using the EP ECU or the C-ECU, there is a further concern of spreading the damage due to unauthorized access to the outside and/or other ECUs. Therefore, the priority determiner unit 104 may determine the priority depending on the type of function implemented by the ECU.

In cases where a common ECU for vehicles, which may implement various vehicle functions, is used to establish the attack path, the leak out of privacy information is less likely as compared with the case where the C-ECU or the EP ECU is used to establish the attack path. However, the concern about hacking of the vehicle control (for example, travel control or release of door lock) and/or about unauthorized access to other ECUs may be present. Therefore, in case the common ECU(s) is used to establish the attack path, the priority may be determined so that the log related to the ECU(s) used as the attack path is high priority.

(b) Determination of Second Priority

In order to analyze the log after the restart, the priority determiner unit 104 determines the second priority with respect to the log related to the function (e.g., the entry point, the protection function) of the ECU, specifically, the log indicating a process in the ECU, a log indicating a resource of the ECU, and a log indicating input and output to and from the ECU.

In order to analyze the log after isolation or the shutoff, the priority determiner unit 104 determines the second priority with respect to the log related to, for example, one or more of the followings: a program process of the isolated or shut-off ECU; a resource of the isolated or shut-off ECU; input and output to and from the isolated or shut-off ECU; and a relevant network packet.

In order to analyze the log after the reprogramming, the priority determiner unit 104 determines the second priority with respect to, for example, one or more of the followings:

a log related to a function of a reprogrammed ECU: and a log indicating a version of the reprogrammed ECU or software.

(5) Aspects

According to the log analysis device 10 of embodiments of the present disclosure, the priority determiner unit 104 can determine the log to be collected and the priority of the log depending on a result of the analysis in the log analyzer unit 103. This makes is possible to efficiently collect and analyze the log needed to make analytics of the cyber attack and/or to check for status of the vehicle-mounted system after the measures against the attack.

According to the log analysis device 10 of embodiments of the present disclosure, the priority may be determined for making analytics of details of the cyber attack and for checking, after the measures against the cyber attack, whether or not the executed measures are appropriate. Therefore, .it is possible to efficiently collect and analyze the log appropriate for the analytics phase of the cyber attack and the log appropriate for a taking-measures phase after the analytics.

5. In-Vehicle System (1) Outline of In-Vehicle System

A configuration of the vehicle-mounted system 20 will be described with reference to FIG. 8. The vehicle-mounted system 20 includes a central gateway device (hereinafter, referred to as a CGW) 21, an external communication electronic control device (hereinafter, referred to as an external communication ECU) 22, an electronic control device (hereinafter, referred to as an ECU) 23, and a network 24 for connecting these to each other. The electronic control device may be also called an electronic control unit.

The CGW 21 is an electronic control device that relays communication between the external communication ECU 22 and the ECUs 23 or between the ECUs 23 via the network 24.

The external communication ECU 22 is an electronic control device that performs wireless communication with the log analysis device 10 by using the communication network 2.

The ECUs 23 are electronic control devices that implement respective functions. The ECUs 23 may be not limited to particular ones. Examples of ECU 23 include travel system electronic control devices controlling an engine, a steering wheel, a brake, and the like, vehicle body system electronic control devices controlling a meter, a power window, and the like, information system electronic control devices such as a navigation apparatus, and a safety control system electronic control device performing control for preventing collision with an obstacle or a pedestrian.

The ECUs may be classified according to a master-slave relationship instead of a parallel relationship. Specifically, the ECUs may be classified into a master and a slave. Two or more ECUs 23 may be provided lower in hierarchy than a specific ECU 23 via a sub-network. In this case, the specific ECU 23 functions as a sub-gateway.

The network 24 connects the CGW 21, the external communication ECU 22, and the ECUs 23. In the embodiments described below, the network 24 is an in-vehicle network. The network 24 may be implementable by not only such a communication system as a Controller Area Network (CAN) and a Local Interconnect Network (LIN) but also a variety of communication system such as Ethernet (registered trademark), Wi-Fi (registered trademark), or Bluetooth (registered trademark).

(2) Configuration of Log Transmission Control Device

Next, a configuration of a log transmission control device 200 included in the vehicle-mounted system 20 will be described. The log transmission control device 200 performs control based on the priority instruction information received from the log analysis device 10, such that the log transmission control device 200 assigns the priority to the logs that indicate the status of the electronic control system, and that the log transmission control device 200 transmits the logs to the log analysis device 10 based on the priority.

Figure 8:
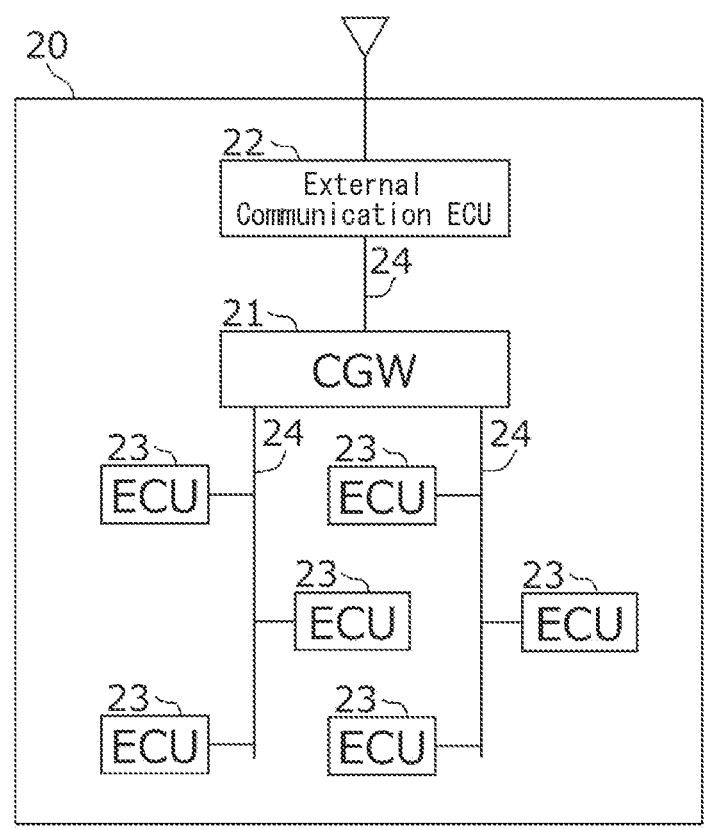
FIG. 8 is a block diagram illustrating an example of a configuration of a vehicle-mounted system communicating with the log analysis device.

The log transmission control device 200 is provided inside the CGW 21 in FIG. 8, for example. However, the location of the log transmission control device 200 is not limited to this example. The location of the log transmission control device 200 may be any location connected to the network 24, for example. For example, the log transmission control device 200 may be provided as an independent dedicated ECU or may be provided in the ECU 23 having a function of a sub-gateway.

Figure 9:
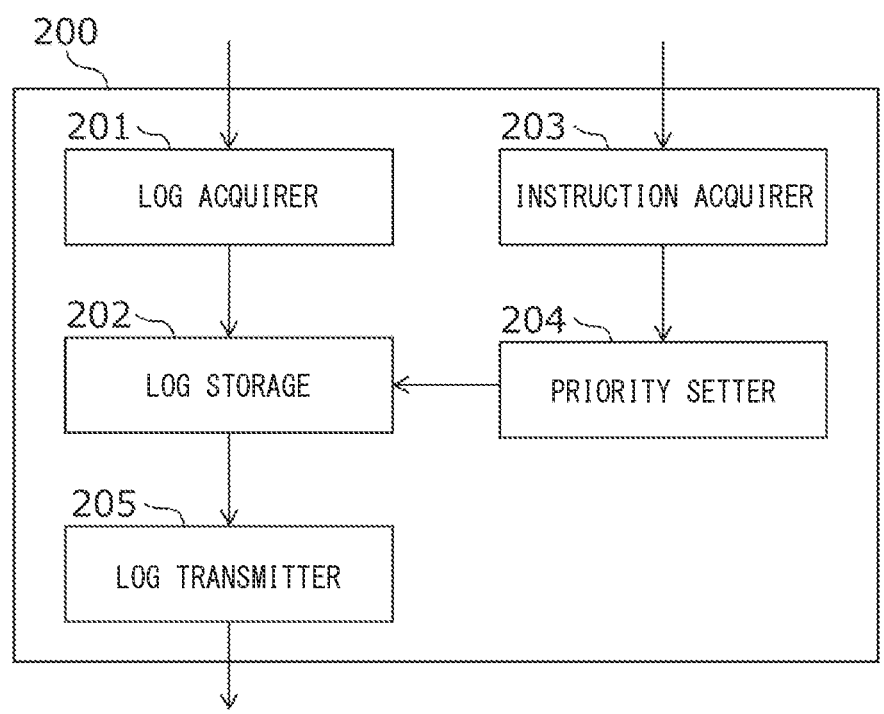
FIG. 9 is a block diagram illustrating a configuration example of a log transmission control device included in the vehicle-mounted system.

A configuration of the log transmission control device 200 will be described with reference to FIG. 9. The log transmission control device 200 includes a log acquirer unit 201, a log storage unit 202, an instruction acquirer unit 203, a priority setter unit 204, and a log transmitter unit 205.

The log acquirer unit 201 acquires a log indicating status of the ECU 23 or the network connected to the log transmission control device 200. The log indicating the status of the ECU 23 is, for example, a log recording not only an operation of a respective function implemented by the ECU 23 but also data about input and output to and from the ECU 23 (data input interval, data output interval, input data size, output data size, etc.) and a resource such as a CPU usage rate and a memory usage rate of the ECU 23. The status log may further record information on the function or the version of the ECU 23, the information of an automobile model or type which the log transmission control device 200 is mounted, and the like. In addition to the status of the ECU 23, the log may further include such information as time information and identification information of the ECU.

The log storage unit 202 is a volatile or non-volatile memory, and stores the status log acquired by the log acquirer unit 201.

The instruction acquirer unit 203 receives the priority instruction information transmitted from the log analysis device 10.

In cases of the log transmission control device 200 provided inside the CGW 21, the instruction acquirer unit 203 may further receive the measures instruction information transmitted from the log analysis device 10.

The priority setter unit 204 assigns the priority to the log that the log storage unit 202 stores in, as indicated by the priority instruction information acquired by the instruction acquirer unit 203.

In the present embodiment, that the priority setter unit 204 is configured to assign the first priority or the second priority determined by the log analysis device 10 to the logs. However, when default priority set by a manufacturer or a seller of the vehicle is stored in advance, or when a device for determining the priority and giving the instruction is provided inside the vehicle-mounted system 20, the priority setter unit 204 may further assign, to the logs, the default priority or the priority that is based on the instruction from the inside of the vehicle-mounted system 20. In this case, when the instruction acquirer unit 203 receives the priority instruction information, the default priority is updated to the first priority or the second priority, and the updated priority is assigned to the logs.

The log transmitter unit 205 transmits the log stored in the log storage unit 202 to the log analysis device 10 based on the priority assigned to the logs. The log transmitter unit 205 transmits the logs stored in the log storage unit 202 in order from the high priority assigned log. Alternatively, a high priority status-log may be transmitted to the log analysis device 10 at a high frequency and a low priority status-log may be transmitted to the log analysis device 10 at a low frequency.

6. Log Collection System

Figure 10:
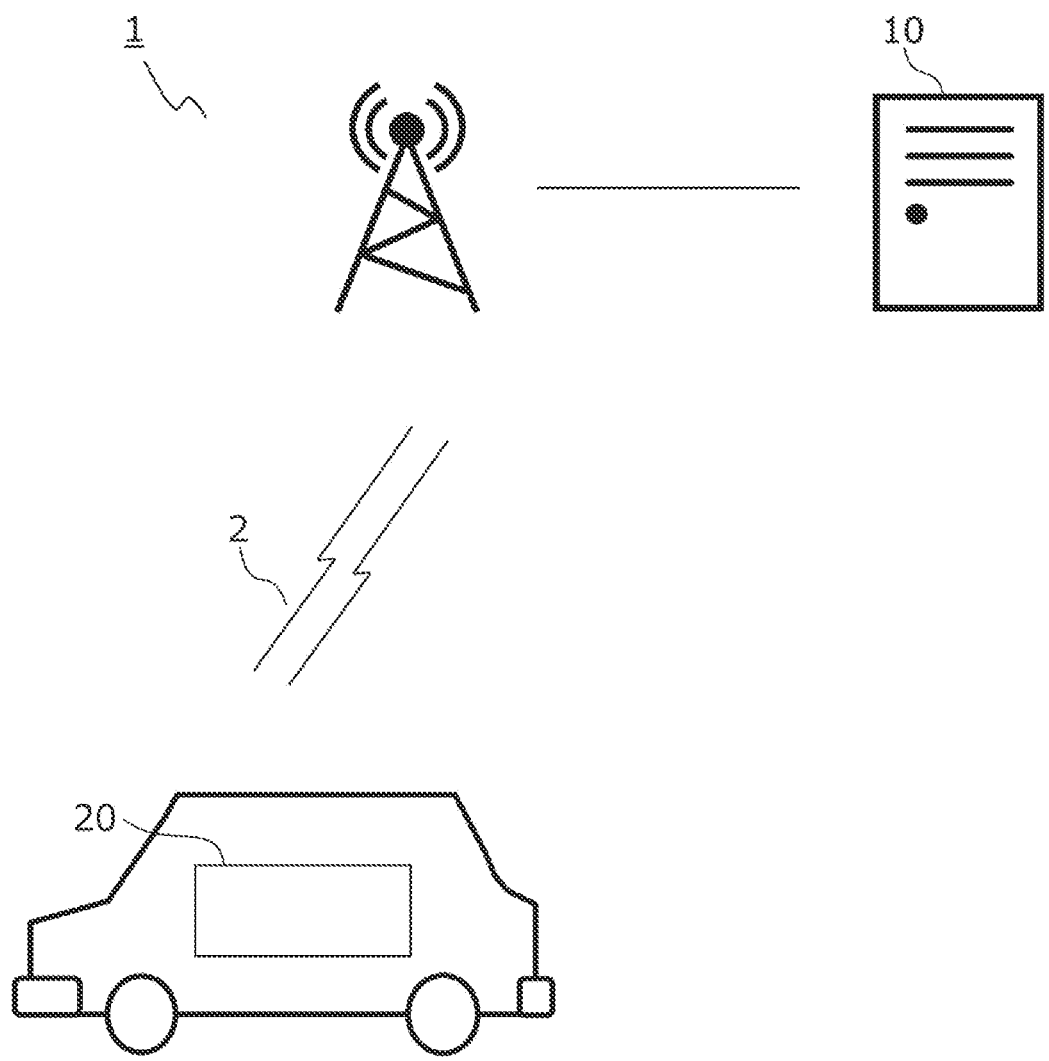
FIG. 10 is a diagram illustrating a configuration example of a log collection system including the log analysis device and the vehicle-mounted system.

FIG. 10 illustrates an example of a log collection system 1 including the log analysis device 10 and the vehicle-mounted system 20. The log analysis device 10 and the vehicle-mounted system 20 perform communication with each other via the communication network 2. In the following embodiments, it is assumed that the electronic control system included in the log collection system 1 is the vehicle-mounted system 20 mounted in an automobile. However, the electronic control system is not limited to the vehicle-mounted system.

Examples wireless communication system used in the communication network 2 include IEEE 802.11 (WiFi (registered trademark)), IEEE 802.16 (WiMAX (registered trademark)), (Wideband Code Division Multiple Access (W-CDMA), High Speed Packet Access (HSPA), Long Term Evolution (LTE), and Long Term Evolution Advanced (LTE-A), 4G, 5G. Further, Dedicated Short Range Communication (DSRC) may be used. Examples of wired communication system used in the communication network 2 include a wired local area network (LAN), the Internet, and a fixed telephone line.

In the above, the log analysis device and the vehicle-mounted system performing communication with the log analysis device have been described as embodiments.

The terms used in the embodiments are examples and may be replaced with terms that are synonymous or encompasses synonymous functions.

The block diagram used in the description of the embodiments represents classification and arrangement of the configuration of the device on a function basis. The respective functions may be implemented by any hardware combination, or by any combination of hardware and software. Since the blocks represent the functions, such a block diagram is to be understood as disclosures of a method and a program for implementing the method.

Functional blocks construable as processes, flows, and methods described in respective embodiments may be changed in order and/or arrangement. However, there may be some constrains on the change. An example of the restriction is a relationship in which a certain step or block uses a result of the preceding step or block.

The terms such as first, second, to N-th (where N is an integer) used in embodiments and in the claims may be used to distinguish two or more configurations and methods of the same kind and may not be intended to limit the order or superiority.

The above-described embodiments assume the log analysis device performing communication with the vehicle-mounted system mounted in a vehicle. However, this is an example and does not limit the present disclosure. The present disclosure is not limited to the vehicle-mounted device for vehicles.

The above embodiments assume the system performing communication with the log analysis device is mounted in a vehicle, but in other embodiment, the system may be carried by a pedestrian.

Examples of forms of the log analysis device include a form of component, a form of semifinished product, and a form of finished product.

Examples of the form of component include a semiconductor device, an electronic circuit, a module, and a microcomputer.

Examples of the form of semifinished product include an electronic control device (electronic control unit (ECU)) and a system board.

Examples of the form of finished product include a cellular phone, a smartphone, a tablet computer, a personal computer (PC), a workstation, and a server.

Examples of form of the log analysis device include a device having a communication function and the like, and include a video camera, a still camera, and a car navigation system.

Devices or functions such as an antenna or a communication interface may be added to the log analysis device.

Embodiments of the present disclosure are not limited to the forms implemented by dedicated hardware that has the configurations and functions described in embodiments. The embodiments of the present disclosure may also be implemented by a combination of a program stored on a storage medium such as a memory, a hard disk, etc., and general-purpose hardware that has a dedicated or general-purpose CPU that can execute the program.

A program stored in a non-transitory tangible storage medium (for example, an external storage device (a hard disk, a USB memory, a CD/BD, etc.) of dedicated or general-purpose hardware, or an internal storage device (a RAM, a ROM, or the like)) may also be provided to dedicated or general-purpose hardware, or provided from a server via a communication line via or not via a non-transitory storage medium. This makes it possible to provide the latest functions via program upgrade.

An example of the log analysis device is directed to a server device performing communication with a vehicle-mounted system mounted in an automobile. However, the log analysis device is not limited to this example. The log analysis device may be a device performing communication with an electronic control system not mounted in an automobile.

The units and methods described in the present disclosure may be implemented by a special purpose computer created by configuring a memory and a processor programmed to execute one or more particular functions embodied in computer programs. Alternatively, the units and methods described in the present disclosure may be implemented by a special purpose computer created by configuring a processor provided by one or more special purpose hardware logic circuits. Alternatively, the units and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A log analysis device comprising:
a receiver unit that receives a plurality of logs from an electronic control system mounted in a movable object, each log indicating status of the electronic control system mounted in the movable object;
a log analyzer unit that analyzes an abnormality in the electronic control system by using the plurality of logs received by the receiver unit;
a priority determiner unit that, depending on a result of the analyzing of the plurality of logs by the log analyzer unit, determines, on a log-by-log basis, a priority of each subsequent log of a plurality of subsequent logs for the electronic control system to transmit to the log analysis device;

an instruction generator unit that generates instruction information that provides an instruction for, based on the result of the analyzing of the plurality of logs by the log analyzer unit and based on the priority determined by the priority determiner unit, controlling transmission of each subsequent log; and a transmitter unit that transmits the instruction information generated by the instruction generator unit to the electronic control system;

wherein:

the log analysis device is provided outside of the movable object and wirelessly communicates with the electronic control system of the movable object;

the plurality of logs and the plurality of subsequent logs each include a log recording a dynamic status that is constantly changing in relation to the electronic control system and a log recording a static status that is unchanging in relation to the electronic control system;

the log analyzer unit, the priority determiner unit, and the instruction generator unit are implemented by a processor and memory storing instructions that are executable by the processor;

the priority determiner unit determines a power supply status of the movable object as one of: the power supply status of the movable object is in an OFF state; an accessory power supply of the movable object is in an ON state; and an ignition power supply of the movable object is in an ON state; and the priority determiner unit determines the priority of each subsequent log of the plurality of subsequent logs according to a change in the determined power supply status of the movable object.

2. The log analysis device according to claim 1, wherein by analyzing the log, the log analyzer unit executes:

a first analysis to detect occurrence of an abnormality in the electronic control system;

a second analysis to make analytics of details of the abnormality detected in the first analysis; and upon measures against the abnormality being executed, a third analysis to check for status of the electronic control system after the measures.

3. The log analysis device according to claim 2, wherein the priority determiner unit determines first priority depending on a result of the first analysis, and determines second priority depending on a result of the second analysis, and the log analyzer unit executes the second analysis by analyzing a first subsequent log of the plurality of subsequent logs, which is the log that is transmitted from the electronic control system based on the first priority, and executes the third analysis by analyzing a second subsequent log of the plurality of subsequent logs, which is the log that is transmitted from the electronic control system based on the second priority.

4. The log analysis device according to claim 1, wherein the priority determiner unit determines the priority of each subsequent log according to a detection function of a security sensor of the log analyzer unit.

5. The log analysis device according to claim 1, wherein the priority determiner unit determines the priority of each subsequent log depending on details of the abnormality detected by the log analyzer unit.

6. The log analysis device according to claim 1, wherein the priority determiner unit determines the priority of each subsequent log depending on a type of information protected by an electronic control device included in the electronic control system.

7. The log analysis device according to claim 1, wherein the priority determiner unit determines the priority of each subsequent log depending on a power supply status of the electronic control system and a power supply status of an electronic control device included in the electronic control system.

8. The log analysis device according to claim 1, wherein:

the log analyzer unit analyzes the plurality of logs received by the receiver unit to detect, as the abnormality, a cyber attack on the electronic control system.

9. The log analysis device according to claim 1, further comprising:

a measures determiner unit, implemented by the processor and memory, configured to determine a measure against a cyber attack;

wherein the measure determiner unit determines the measure against the cyber attack in response to the log analyzer unit detecting the cyber attack on the electronic control system as the abnormality, and determines at least one of: restarting an attacked electronic control unit of the electronic control system, isolating the attacked electronic control unit from other electronic control units of the electronic control system, and executing reprogramming with a wireless communication network as the measure against the cyber attack.

10. A method performed by a log analysis device, comprising:

receiving a plurality of logs from an electronic control system mounted in a movable object, each log indicating status of the electronic control system mounted in the movable object;

analyzing an abnormality in the electronic control system by using the plurality of logs received;

determining a power supply status of the movable object as one of: the power supply status of the movable object is in an OFF state; an accessory power supply of the movable object is in an ON state; and an ignition power supply of the movable object is in an ON state;

depending on a result of the analyzing of the plurality of logs, determining, on a log-by-log basis, a priority of each subsequent log of a plurality of subsequent logs for the electronic control system to transmit, the priority of each subsequent log of the plurality of subsequent logs being determined according to a change in the determined power supply status of the movable object;

generating instruction information that provides an instruction for, based on the result of the analyzing of the plurality of logs and based on the determined priority, controlling transmission of each subsequent log; and transmitting the instruction information to the electronic control system;

wherein:

the log analysis device is provided outside of the movable object and wirelessly communicates with the electronic control system of the movable object; and the plurality of logs and the plurality of subsequent logs each include a log recording a dynamic status that is changing constantly in relation to the electronic control system and a log recording a static status that is unchanging in relation to the electronic control system.

11. A non-transitory storage medium storing a program that causes a log analysis device to perform:
receiving a plurality of logs from an electronic control system mounted in a movable object, each log indicating status of the electronic control system mounted in the movable object;
analyzing an abnormality in the electronic control system by using the plurality of logs received;
determining a power supply status of the movable object as one of: the power supply status of the movable object is in an OFF state; an accessory power supply of the movable object is in an ON state; and an ignition power supply of the movable object is in an ON state;
depending on a result of the analyzing of the plurality of logs, determining, on a log-by-log basis, a priority of each subsequent log of a plurality of subsequent logs for the electronic control system to transmit, the priority of each subsequent log of the plurality of subsequent logs being determined according to a change in the determined power supply status of the movable object;
generating instruction information that provides an instruction for, based on the result of the analyzing of the plurality of logs and based on the determined priority, controlling transmission of each subsequent log; and
transmitting the instruction information to the electronic control system;
wherein:
the log analysis device is provided outside the movable object and wirelessly communicates with the electronic control systems of the movable object; and
the plurality of logs and the plurality of subsequent logs each include a log recording a dynamic status that is constantly changing in relation to the electronic control system and a log recording a static status that is unchanging in relation to the electronic control system.

12. A log analysis device comprising:
a receiver unit that receives a plurality of logs from an electronic control system mounted in a movable object, each log indicating status of the electronic control system mounted in the movable object;
a log analyzer unit that analyzes an abnormality in the electronic control system by using the plurality of logs received by the receiver unit;
a priority determiner unit that, depending on a result of the analyzing of the plurality of logs by the log analyzer unit, determines, on a log-by-log basis, a priority of each subsequent log of a plurality of subsequent logs for the electronic control system to transmit to the log analysis device;
an instruction generator unit that generates instruction information that provides an instruction for, based on the result of the analyzing of the plurality of logs by the log analyzer unit and based on the priority determined by the priority determiner unit, controlling transmission of each subsequent log; and
a transmitter unit that transmits the instruction information generated by the instruction generator unit to the electronic control system;
wherein:
the log analysis device is provided outside of the movable object and wirelessly communicates with the electronic control system of the movable object;
the plurality of logs and the plurality of subsequent logs each include a log recording a dynamic status that is constantly changing in relation to the electronic control system and a log recording a static status that is unchanging in relation to the electronic control system;
the log analyzer unit, the priority determiner unit, and the instruction generator unit are implemented by a processor and memory storing instructions that are executable by the processor;
the priority determiner unit determines a power supply status of the movable object as one of: the power supply status of the movable object is in an OFF state; an accessory power supply of the movable object is in an ON state; and an ignition power supply of the movable object is in an ON state; and
the priority determiner unit determines the priority of each subsequent log of the plurality of subsequent logs according to a power supply status of an electronic control unit changing in accordance with a change in the determined power supply status of the movable object.

* * * * *